United States Patent [19]
Johnson

[11] 3,865,400
[45] Feb. 11, 1975

[54] CARRIER BUNK APPARATUS
[76] Inventor: Norman Allen Johnson, 5325 Tenth Ave., South Delta, British Columbia, Canada
[22] Filed: Jan. 25, 1974
[21] Appl. No.: 436,652

[52] U.S. Cl............ 280/179 R, 214/77 R, 294/106
[51] Int. Cl............................................. B60p 7/12
[58] Field of Search ............ 294/88, 106, 111, 112, 294/118; 144/3 R, 3 D, 34 A; 214/3, 77 R, 147 G, 500; 280/143, 145, 179 R

[56] References Cited
UNITED STATES PATENTS
| | | | |
|---|---|---|---|
| 3,008,731 | 11/1961 | Bombardier | 280/179 |
| 3,549,029 | 12/1970 | Rutter | 214/77 R |
| 3,627,351 | 12/1971 | Zimmerman et al. | 280/179 R |

Primary Examiner—Evon C. Blunk
Assistant Examiner—Johnny D. Cherry

[57] ABSTRACT

This disclosure pertains in general to a novel mechanical carrier bunk apparatus and specifically to a cable operated log bunk adapted for use with tracked and rubber tired log skidders and forwarders. The bunk comprises a pair of arcuate jaws the lower end portions of which cross and are pivotally mounted on a transverse base portion. The bunk is opened by gravity and closed by a cable entrained about the pivot means of one of the jaws and reeving means mounted on the jaws. A cam follower is mounted on one jaw and a cam contour on the other jaw, such that interaction therebetween, substantially where the jaws cross, causes the jaws to close substantially uniformly and to be stable laterally in any closed position. The cable enters the base portion between the jaw pivot means such that the base may be mounted on a turntable and the turntable pivoted about a substantially horizontal axis to permit limited relative angular motion between a skidder and a load of logs in the bunk.

14 Claims, 11 Drawing Figures

PATENTED FEB 11 1975

CARRIER BUNK APPARATUS

This invention relates to novel devices which are known in the art to which they pertain as log bunks, bunk jaws, forwarder grapples, or to inverted grapple devices which are of the general character of carrier bunks. In their simplest form, carrier bunks comprise a pair of jaws pivotally mounted on a transverse base, means being provided to open and close the jaws with respect to articles carried therebetween.

In the logging industry, log bunks are found on trucks, forwarders, and harvesters. Closing, cinching, and opening of bunks may be accomplished either manually, by fluid powered actuators, or by winch devices. In my carrier bunk apparatus, closing is accomplished by a flexible tension member interconnected to a winch or other actuator means; opening is accomplished by gravity when the flexible member is released.

Tracked and rubber tired log forwarders require that the bunk apparatus be able to close on load sizes ranging from one to many logs. Further, in traversing rough and irregular terrain, mounting of the bunk apparatus on the forwarder should permit angular movement of the carried load, with respect to the forwarder, about both vertical and horizontal axes. Movement of the bunk apparatus, with respect to the carried logs, should improve the hold of the bunk apparatus on the logs. Finally, a log bunk apparatus should provide flexibility and enhancement of its load holding power on at least one side, preferably the bottom, whereby to accomodate lateral forces on the load and shifts of logs in the load due to movement of a forwarder or other such vehicle upon which the bunk is mounted.

Accordingly, it is one object of this invention to provide an improved mechanical carrier bunk apparatus which is closed by a flexible tension member and opened by gravity.

It is still another object of this invention to provide flexible tension member reeving means between a pair of jaws in a mechanical carrier bunk apparatus whereby the lowermost carried articles are in contact with the flexible tension member.

Yet another object of this invention is provision of a log bunk apparatus, the jaws of which cross in overlapping relation and have cam means which interact whereby the jaws close substantially uniformly and symmetrically on loads varying in size from one to many logs, irrespective of gravitational or dynamic forces on the bunk apparatus.

Still another object of this invention is provision of a log bunk apparatus, the jaws of which cross in overlapping relation and have cam means which interact to maintain a carried load in a substantially stable position with respect to a log forwarder irrespective of gravitational or dynamic forces arrising out of movement of the forwarder and load.

A further object of this invention is to provide interaction of the jaws with the transverse head of a log bunk apparatus whereby to limit opening and closing of the jaws.

A further object of this invention is provision of bunk mounting means including a turntable which provides entrainment of a cable substantially through its central portion while at the same time permitting relative angular movement between a forwarder and a load on a traversed surface.

Another object of this invention is provision of bunk mounting means including pivotal means which provide entrainment of a cable while at the same time permitting relative angular movement between a forwarder and a load in a plane substantially perpendicular to a traversed surface.

These and still further objects and advantages of the present invention reside in the details of construction of a preferred embodiment disclosed herein and will be evident to one skilled in the art from a study of the specification and the accompanying drawings. Therefore, the preferred embodiment disclosed is merely exemplary and is not intended to detract from the full scope of the invention as set out in the annexed Claims.

In the drawings, wherein like numerals refer to like parts:

Figure 1:
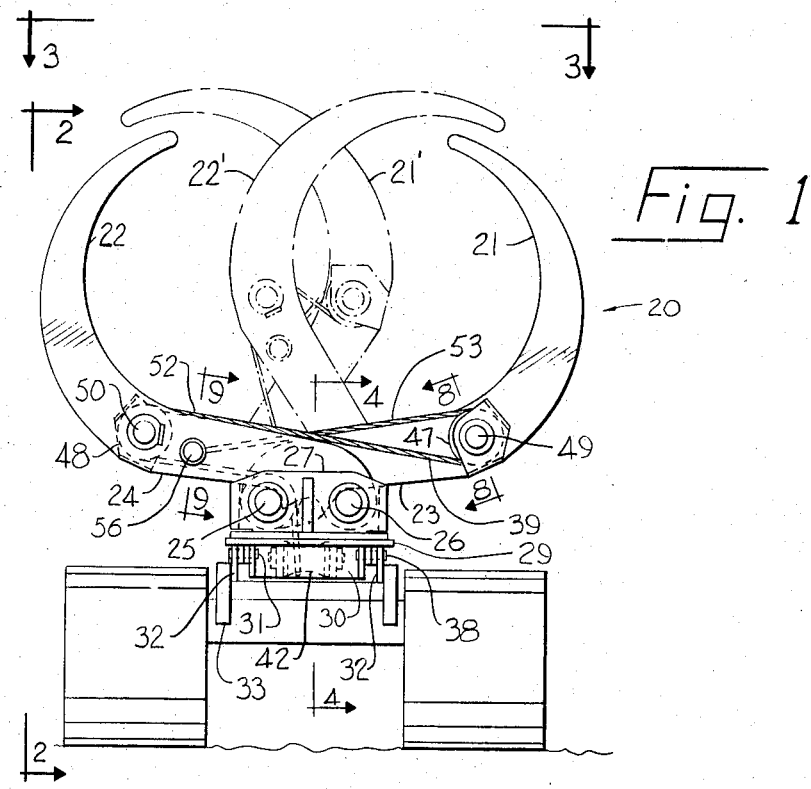
FIG. 1 is a rear view of a carrier bunk apparatus, in accordance with my invention, mounted on a rear portion of a log forwarder, illustrating the bunk jaws open in solid lines and closed in broken lines.
Figure 2:
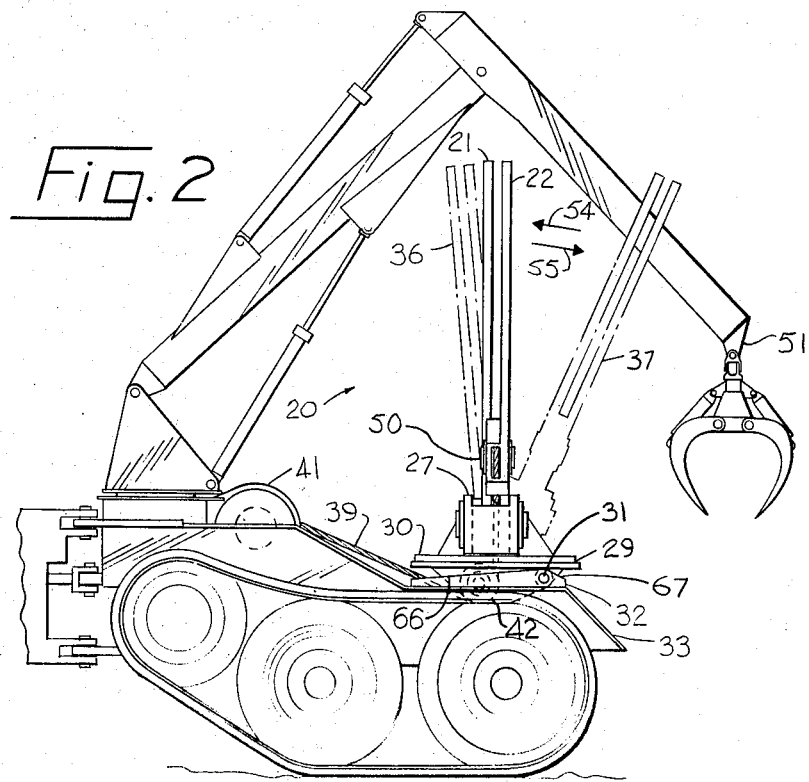
FIG. 2 is a side elevation of the carrier bunk apparatus taken along line 2—2 in FIG. 1.
Figure 3:
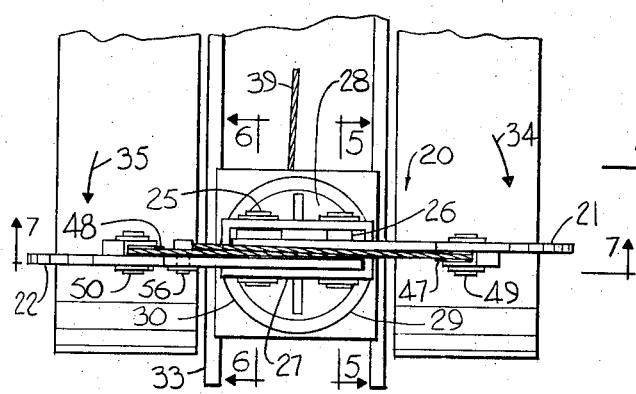
FIG. 3 is a plan view of the bunk apparatus taken along line 3—3 in FIG. 1.

Referring now to the drawings, FIGS. 1, 2, and 3 illustrate the general structure of a preferred embodiment of a carrier bunk apparatus 20 in accordance with my present invention. First and second jaws 21 and 22, having lower end portions 23 and 24 crossing in overlapping relation, are pivotally mounted respectively on first and second pivot means 25 and 26 of transverse base means 27. Transverse base means 27 is operatively mounted on rotatable portion 28 of turntable means 29. Fixed portion 30 of turntable 29 is pivotally mounted, by means of pins 31 and 38 on bracket means 32 secured to self-loading forwarder frame 33. Pivoting of bunk 20 in directions 54 and 55 are limited respectively by portions 66 and 67 of bracket means 32. Hence bunk jaws 21 and 22 may be closed to positions 21' and 22', bunk 20 may be pivoted in directions 34 and 35 about the axis of turntable 29 and further pivoted in directions 54 and 55 respectively to positions 36 and 37 about the axis of pins 31 and 38.

With further reference to FIGS. 4, 6, 8, 9, and 10, it will be evident that a flexible tension member 39, comprising cable 40 interconnected to conventional winch means 41, is entrained about entrainment means 42 comprising roller 43 rotatably mounted by shaft 44 on turntable fixed portion 30. Cable 40 passes through substantially concentric opening 61 in rotatable portion 28 and is further entrained about sheave means 45 which is rotatably mounted on shaft 46 of pivot means 25. Cable 40 is still further entrained in jaw reeving means, comprising sheaves 47 and 48, rotatably mounted respectively on shafts 49 and 50, anchor means 56 pivotally mounted on jaw 22, and ferrule 57. It will now be clear that tensioning cable 40 will ultimately cause jaws 21 and 22 to assume positions 21' and 22' and loosening cable 40 will allow gravity to return jaws 21 and 22 to their open position. Moreover, when a number of logs are placed in bunk 20 by loader means 51, tensioning of cable 40 will cause jaws 21 and 22 to close operatively about the logs, the lower logs resting on cable reeving portions 52 and 53. Bunk 20 may pivot in either of directions 34, 35, 54 and 55 without interfering with the operative function of cable 40. Finally, pivoting of bunk 20 in direction 55 causes the cross-sectional area in the jaws thereof to decrease thereby enhancing the hold of bunk 20 on a load of logs.

Figure 4:
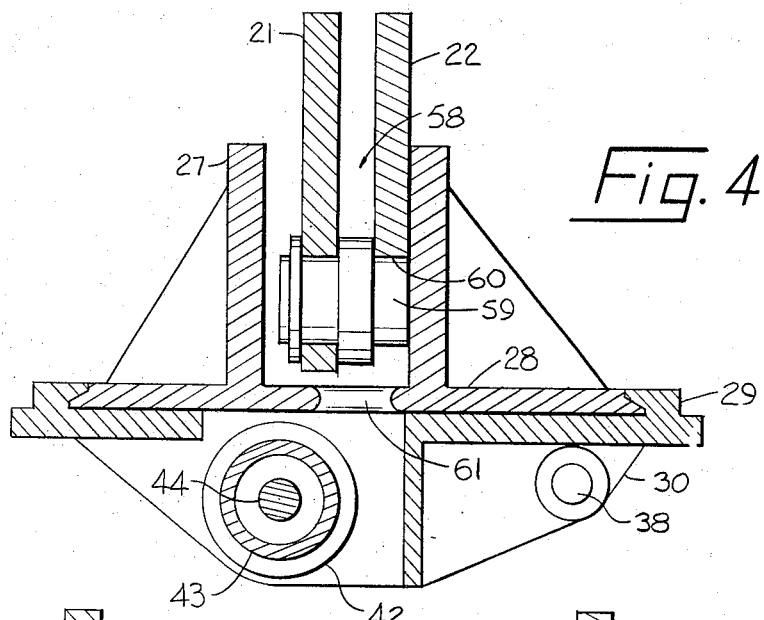
FIG. 4 is a partial sectional view of a transverse base, overlapping lower jaw portions, and cam means of the bunk apparatus taken substantially along line 4—4 in FIG. 1.
Figure 5:
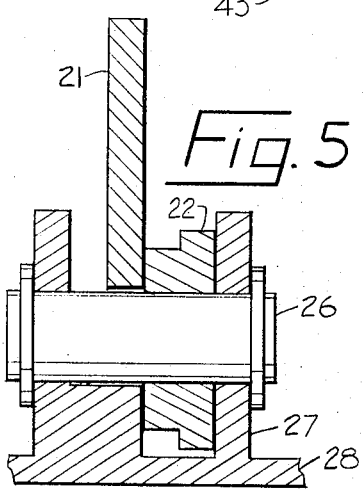
FIG. 5 is a partial sectional view of one of the transverse base pivot means taken substantially along line 5—5 in FIG. 3.
Figure 6:
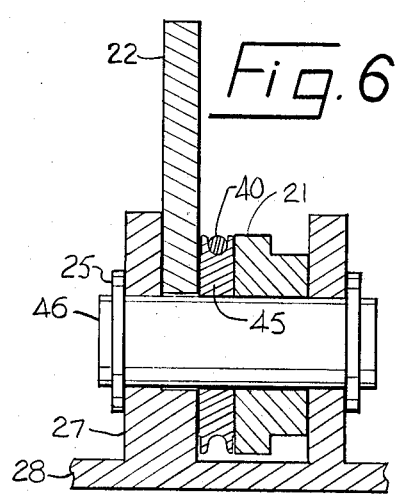
FIG. 6 is a partial sectional view of the other of the transverse base pivot means taken substantially along line 6—6 in FIG. 3.
Figure 7:
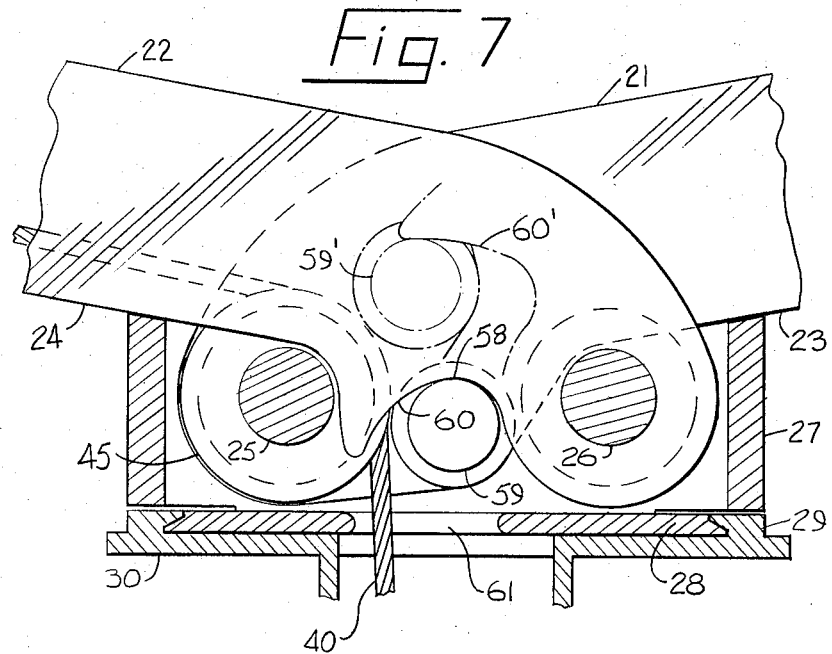
FIG. 7 is a partial sectional view of the transverse base, and lower jaw portions, and cam means taken substantially along line 7—7 in FIG. 3.
Figure 8:
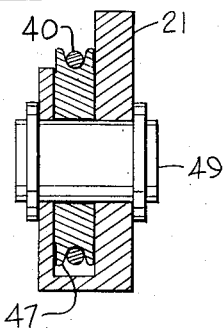
FIG. 8 is a partial sectional view of sheave means on one of the bunk jaws taken substantially along line 8—8 in FIG. 1.
Figures 9, 10:
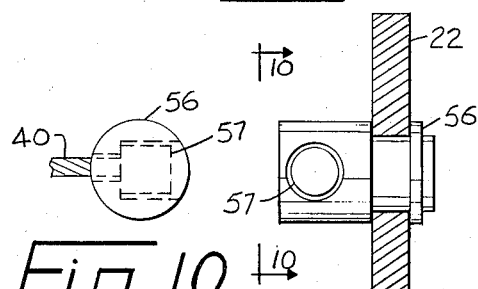
FIG. 9 is a partial sectional view of anchor means taken substantially along line 9—9 in FIG. 1.
FIG. 10 is an elevation of the anchor means taken along line 10—10 in FIG. 9.

FIGS. 1, 4, and 7, illustrate cam means 58 comprising cam follower means 59 on first jaw 21 and cam contour means 60 operatively mounted on second jaw 22. Interaction of cam follower 59 and contour 60 causes jaws 21 and 22 to close substantially uniformly and prevent their flopping to either side when they assume a closed or partially closed position.

It will be evident from the drawings, in particular FIG. 7, that cam follower 59 and cam contour 60 move relative to each other to positions 59' and 60' when jaws 21 and 22 move from their open to their closed position. Moreover, if cam contour 60 were continuous, that is, formed an elongated enclosure in which cam follower 59 moved, jaws 21 and 22 would have a distinct relative position at all closed or partially closed positions. As illustrated, it would appear that jaw 22 might be free to move contour 60 away from cam follower 59, thereby moving independently of jaw 21.

However, when the line of action of force of member 39 on jaw 22 passes below the axis of pivot means 26, member 39 produces a moment on jaw 22 which is overcome by the reaction between follower 59 and contour 60; this is more clearly illustrated by jaw positions 21' and 22' in FIG. 1. Therefore, whereas an enclosed cam contour is fully operative, the embodiment illustrated is preferred for reasons of economy and compactness, it being remembered that open contour 60 must be on that jaw 22 into which member 39 is first entrained and the line of force of member 39 must pass below the pivot point of jaw 22 for all operative closed positions of bunk 20.

Figure 11:
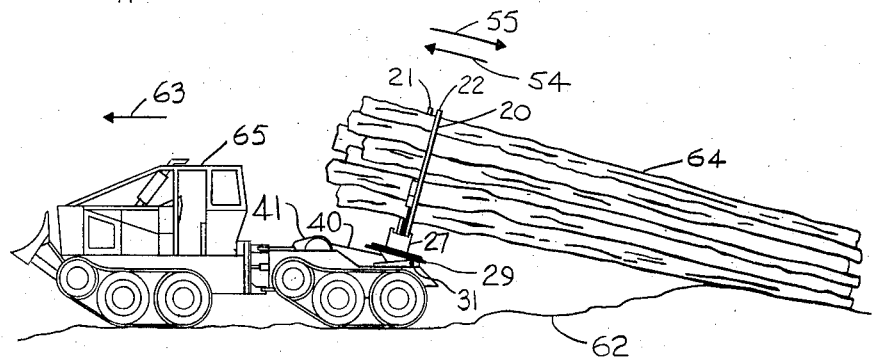
FIG. 11 is a schematic view of a forwarder skidding a load of logs over irregular terrain.

FIG. 11 illustrates use of my invention in combination with a non-self-loading log forwarder 65 traversing irregular terrain 62 in direction 63. The irregularity of terrain 62 is such that logs 64 move angularly in directions 54 and 55 with respect to the axis of pin 31 on forwarder 65. As forwarder 65 turns corners, logs 64 pivot on turntable 29 with respect to forwarder 65.

It is believed that my invention of a carrier bunk apparatus will have been clearly understood from the foregoing detailed description of my now preferred and illustrated embodiment. Various modifications, changes, additions, and equivalents may be resorted to in view of these teachings by one skilled in this art without departing from the spirit of my invention. For instance, a variety of jaw and transverse base shapes and designs may be adapted to fulfill the objects of my invention. Whereas cam follower 59 is rotatably mounted, it might be fixed to jaw 21 and contour 60, as noted, might fully enclose cam follower 59. Cam follower 59 might comprise, either singly or in combination, pivots, sliders and eccentrics. Contour 60 might be varied in shape, depending upon the nature of cam follower 59 and the required degree of uniformity of relative movement of jaws 21 and 22. Transverse base means 27 might readily be fixed to a vehicle frame where the pivotal motion of turntable means 29 is not required. Turntable means 29 might comprise singly or in combination radial and thrust bearing means of antifriction or other design. Therefore, the present invention is not to be construed as limited to the specific details illustrated and described above, and whereas a choice between variations, modifications, changes, additions and equivalents falling within the true scope of my invention will depend largely upon the circumstances in which it is used, it is my express intention that no limitations be implied and that the hereto annexed claims be given the broadest interpretation to which the language fairly admits.

The embodiments of the invention in which an exclusive property or privilege is claimed are defined as follows:

1. A carrier bunk apparatus comprising a pair of jaws each having upper and lower end portions, transverse base means having pivot means at each end, said lower end portions of said pair of jaws crossing in overlapping relation and operatively mounted on said pivot means, cam contour means operatively mounted on one of said lower end portions and cam follower means operatively mounted on the other of said lower end portions, reeving means operatively mounted on each of said pair of jaws intermediate said upper and lower end portions, a flexible tension member operatively entrained in said reeving means, whereby tensioning and loosening of said flexible tension member respectively closes and opens said carrier bunk apparatus.

2. A carrier bunk apparatus as defined in claim 1, wherein said reeving means includes sheave means rotatably mounted on one of said pair of jaws and anchor means pivotally mounted on the other of said pair of jaws.

3. A carrier bunk apparatus as defined in claim 2, wherein said cam contour means is operatively mounted on said one of said pair of jaws upon which said sheave means is mounted, said flexible tension member and said cam follower means applying substantially equal moments to said one of said pair of jaws.

4. A carrier bunk apparatus as defined in claim 2, wherein said anchor means and said one of said jaws interact to limit closing of said pair of jaws.

5. A carrier bunk apparatus as defined in claim 1, wherein said reeving means includes sheave means rotatably mounted on each of said pair of jaws and anchor means operatively mounted on one of said pair of jaws.

6. A carrier bunk apparatus as defined in claim 5, wherein said cam contour means is operatively mounted on said one of said pair of jaws upon which said anchor means is mounted.

7. A carrier bunk apparatus as defined in claim 1, wherein said transverse base means is operatively mounted on turntable means.

8. A carrier bunk apparatus as defined in claim 7, wherein said flexible tension member passes between said pivot means at each end of said transverse base means and through a substantially concentric opening in said turntable means.

9. A carrier bunk apparatus as defined in claim 1, including turntable means having fixed and rotatable portions, said transverse base means operatively mounted on said rotatable portion, entrainment means operatively mounted on said fixed portion, said flexible tension member further entrained about one of said pivot means and said entrainment means.

10. A carrier bunk apparatus as defined in claim 1, including turntable means having fixed and pivotal portions, said transverse base means operatively mounted on said pivotal portion, said fixed portion pivotally mounted on vehicle means for angular motion about a substantially horizontal axis.

11. A carrier bunk apparatus as defined in claim 10, wherein an entrainment means is operatively mounted on said fixed portion for rotation about an axis substantially parallel to said horizontal axis, tension in said flexible tension member imparting a pivotal moment to said turntable means and said carrier bunk apparatus.

12. A carrier bunk apparatus as defined in claim 1, wherein said pair of jaws interact with said transverse base to limit opening and closing of said pair of jaws.

13. A carrier bunk apparatus as defined in claim 1, wherein said cam follower means and said contour means interact to limit closing of said pair of jaws.

14. A log bunk apparatus comprising first and second jaws each having upper and lower end portions, transverse base means having first and second pivot means, said lower end portions of said first and second jaws crossing in overlapping relation and mounted respectively on said first and second pivot means, cam follower means operatively mounted on said first jaw in contact relation with cam contour means operatively mounted on said second jaw, reeving means operatively mounted on each of said first and second jaws intermediate said upper and lower end portions, a cable entrained about said first pivot means and in said reeving means, whereby tensioning and loosening said cable respectively closes and opens said log bunk apparatus.

* * * * *